Dec. 26, 1961   W. M. FREEMAN   3,014,549
AUTOMATIC AUTOMOBILE TRANSMISSION SAFETY DEVICE
Filed Feb. 3, 1960   2 Sheets-Sheet 1

INVENTOR
WILBERN M. FREEMAN

BY Cushman, Darby & Cushman
ATTORNEYS

Dec. 26, 1961  W. M. FREEMAN  3,014,549
AUTOMATIC AUTOMOBILE TRANSMISSION SAFETY DEVICE
Filed Feb. 3, 1960  2 Sheets-Sheet 2
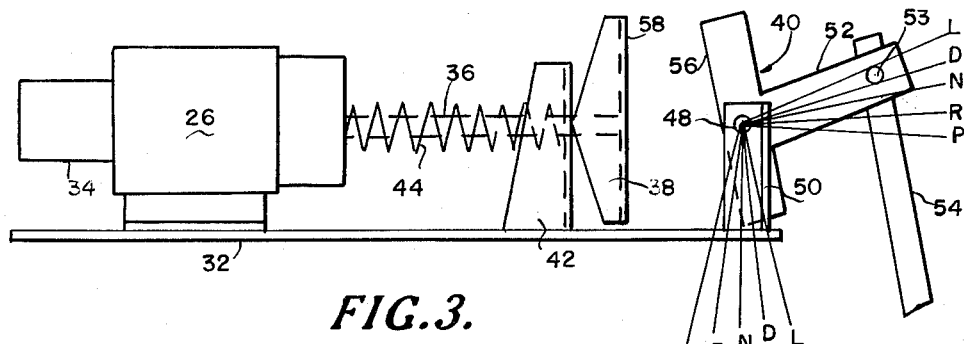
FIG. 3.
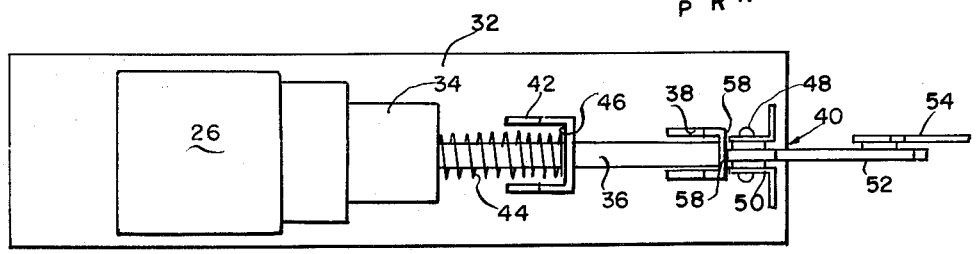
FIG. 4.
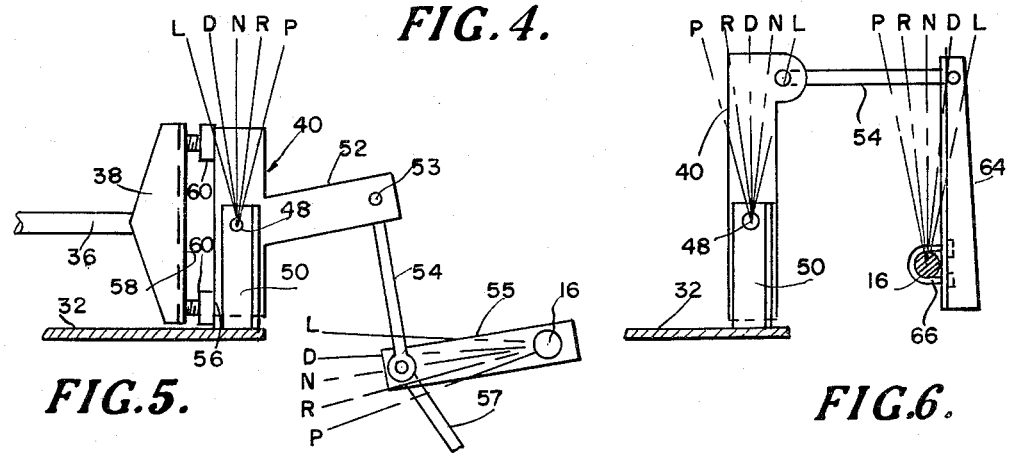
FIG. 5.  FIG. 6.
FIG. 7.  FIG. 8.
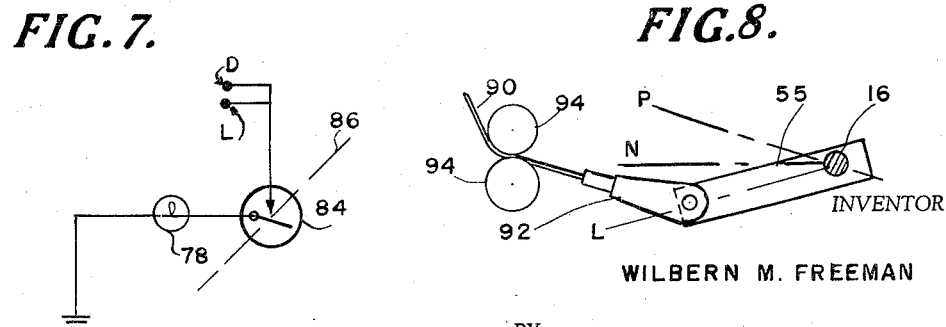
INVENTOR
WILBERN M. FREEMAN
BY Cushman, Darby & Cushman
ATTORNEYS United States Patent Office 3,014,549
Patented Dec. 26, 1961

3,014,549
AUTOMATIC AUTOMOBILE TRANSMISSION
SAFETY DEVICE
Wilbern M. Freeman, 3501 NW. 7th Ave., Miami, Fla.
Filed Feb. 3, 1960, Ser. No. 6,396
8 Claims. (Cl. 180—82)

This invention relates to a safety device for motor vehicles and more particularly to a safety device which will automatically move the transmission selector lever of a motor vehicle, having an automatic transmission, from its reverse, drive, or low operative position into neutral when the vehicle's engine is running and when either of the front doors of the vehicle is open.

One of the common causes of accidents involving motor vehicles involves the opening of one of the vehicle doors when the vehicle's engine is running and the transmission is in an operative or drive position. Oftentimes the operator or the passenger of the vehicle will attempt to leave the vehicle when it is stopped and the transmission selector lever is in one of the operative positions. In such cases, if the parking brake is not on, the vehicle may move either forwardly or backwardly when unattended or while the occupant or driver is attempting to leave the vehicle. There are various known devices for automatically cutting off the ignition switch of a motor vehicle upon the opening of either of the front doors when the engine is running, and there are also known devices for automatically moving the transmission selector lever into its neutral position upon the opening of the front doors or by other automatically-operated switch means when the engine is running. The known devices, however, have not always proved successful or reliably effective. This invention is an improvement over the known devices and particularly relates to a simple device which is extremely reliable and relatively inexpensive to install in a motor vehicle. The device of this invention comprises a solenoid which is electrically connected to a door-operated switch in such a manner that when either of the front doors of the vehicle is opened, while the engine is running and the transmission selector lever is in any of its operative positions, the solenoid will become energized. Cooperating with the plunger or armature of the solenoid is a pivotally mounted lever which is connected by suitable linkage to the transmission selector lever shaft so that upon energization of the solenoid the lever will be caused to pivot to shift the transmission selector lever rod into its neutral position and thereby eliminate any possibility of leaving a vehicle unattended, with its motor running and its transmission in an operative position. This invention also contemplates the providing of visual means to indicate to the operator that the vehicle's engine is idling and it is in gear. The indicator preferably comprises a lamp electrically connected to either the speedometer cable or the accelerator linkage of the vehicle in such a manner that the lamp will be lighted when the vehicle is in gear and the engine is idling or turning over at a low rate. Of course, any suitable indicator may be substituted for the light bulb of the present invention, such as by a buzzer, bell, or other known indicators.

It is an object, therefore, of this invention to provide a safety device for motor vehicles which will, upon the opening of either of the front doors of the vehicle while the vehicle's engine is running, effect the shifting of the transmission selector lever from any of its operative positions to a neutral position.

It is a further object of this invention to provide visual means to indicate to the operator that the vehicle is in gear during periods of idling or when the engine is turning over at a low rate.

It is another object of this invention to provide an improved and reliable and inexpensive safety device for shifting the selector lever of a motor vehicle having an automatic transmission from any of its operative positions to a neutral position upon the opening of the vehicle door, and to simultaneously indicate to the operator that the vehicle is in gear and the engine is idling.

These and further objects and advantages will become readily apparent to those skilled in the art upon reading the following detailed description taken in conjunction with the appended drawings in which:

FIGURE 3 is a side elevational view of the solenoid and showing the transmission selector rod actuating lever when the transmission selector is in one of its operative positions;

FIGURE 4 is a top plan view of the device of FIGURE 3 but showing the position assumed when the solenoid is energized;

FIGURE 5 is one modification of the linkage means connecting the lever to the transmission selector rod;

FIGURE 6 is another modification of the linkage means connecting the transmission selector rod;

FIGURE 7 is a modified form of the visual indicator means; and

FIGURE 8 is a view corresponding to FIGURE 5 but showing an additional modification.

Figure 1:
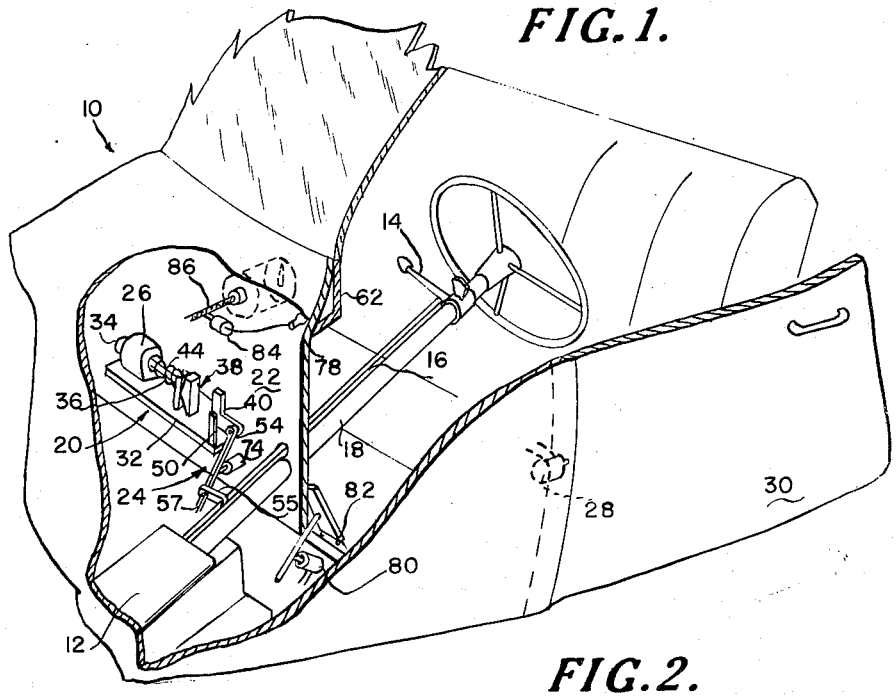
FIGURE 1 is a fragmentary perspective view with parts broken away and parts in section of a motor vehicle equipped with the safety device.

Referring now to the drawings and particularly to FIGURE 1, there is shown a motor vehicle 10 equipped with an automatic transmission 12 and having a transmission selector lever 14 mounted upon a transmission selector lever rod 16 carried by the steering column 18 of the vehicle. The preferred safety device of the present invention, indicated generally at 20, is mounted forward of the vehicle fire wall 22 and is connected to the rod 16 by transmission shifting linkage, indicated generally as 24. The solenoid 26 of the safety device 20 is connected by suitable circuitry to the engine-ignition circuit of the vehicle 10 and to door-operated switches 28 which cooperate with the front doors 30 of the vehicle so that when any one of the fornt doors is opened the switch 28 associated therewith will close to effect energization of the solenoid 26. When the solenoid 26 is energized, the linkage 24 connected to the rod 16 will cause it to move to shift the transmission from any of its operative or drive positions to its neutral position.

Referring now to FIGURES 3, 4 and 5, the means by which the transmission selector rod 16 is shifted when the solenoid 26 is energized, will now be described. The solenoid 26 is mounted upon a bracket 32 which may be mounted to any portion of the vehicle, such as the frame, engine, or fire wall, in a position adjacent to the transmission selector rod 16. The solenoid armature 34 has a plunger 36 mounted on its one end that is facing toward the transmission shifting linkage, and when the solenoid 26 is de-energized the armature 34 and plunger 36 are in a position away from the shifting linkage so that upon energization of the solenoid the plunger 36 moves toward the linkage. The plunger 36 has a bumper plate 38 of substantially U-shape cross sectional configuration mounted at its outer end to cooperate with a pivotally mounted lever 40 when the solenoid 26 is energized. The plunger 36, with its associated bumper plate 38, is adapted to reciprocate within the vertical guide 42 mounted upon the bracket 32 in alignment with the lever 40. A coil spring 44 mounted about the plunger 36 is disposed between the transverse wall 46 of the guide 42 and one end of the solenoid armature 34 so that when the solenoid 26 is de-energized, the spring 44 urges the armature 34 and the plunger 36 in a direction away from the vertical guide 42. The lever 40 is pivotally mounted, as at 48, to a vertically extending support 50 mounted upon the bracket 32 and spaced from but in linear alignment with vertical guide 42 and the path of motion of the bumper plate 38. The lever 40 is generally T-shaped and has a portion 52 to which is connected a linkage rod or cable 54, as by the pin 53, which, in turn, has its other end connected to a lever 55 fixedly mounted on the transmission selector rod 16. When the operator selects the desired transmission position, either park, reverse, neutral, drive or low by moving of the transmission rod selector lever 14, the rod 16, lever 55 and the rod 57 carried thereby and connected to the transmission 12 cause the linkage rod 54 to move the lever 40 about its support 50. When the transmission is in its neutral position, the lever 40 is pivoted about the support 50 so that the edge 56 of the lever 40 will be parallel to the opposing face 58 of bumper plate 38 and substantially perpendicular to the bracket 32, as indicated by the line 48–N and shown in FIGURE 5. If the transmission is in any of its other positions, either park, reverse, drive or low, the edge 56 of the lever 40 will be inclined at an angle relative to the face 58 of the plunger 38 and at an angle to the bracket 32, as shown by the lines P–48, R–48, D–48 and L–48. In FIGURE 3 the lever 40 and linkage rod 54 are illustrated in the position they would assume when the selected transmission is low.

In operation, when the solenoid is energized the armature 34 and plunger 36 will move towards the lever 40, as shown in FIGURE 4, against the action of the coil spring 44. The plunger 36 and bumper plate 38 move toward the lever 40 until the face 58 of the bumper plate engages the opposite edge 56 of the lever 40 causing the lever to pivot about its support 50 until the edge 56 is parallel to the face 58 of the bumper plate. When the lever 40 is in such a position its edge 56 is perpendicular to the bracket 32 and the operating link 54 connected to the portion 52 of the lever 40 has caused the transmission selector rod 16 to move to its neutral position by the lever 55 and rod 57, thus shifting the vehicle's transmission 12 from low to neutral. Alternatively, the bumper plate 38 may be provided with adjustable screws 60 in its face 58 to permit adjustment and regulation of the amount of travel of the bumper plate to insure the proper pivotal movement of the lever 40. As soon as the vehicle's transmission is in its neutral position, the solenoid 26 is de-energized; whereupon, the coil spring 44 causes the armature 34 and plunger 36 to move away from the lever 40.

In FIGURE 6 there is shown a modified transmission shifting linkage 24 that may be employed when the safety device 20 is to be mounted under the dashboard 62 of the vehicle 10. In this particular installation the lever 40 is a straight member instead of being T-shaped and the linkage rod 54 is connected to the upper end of the lever above its pivotal mounting 48. The other end of the rod 54 is connected to one end of the shift lever rod linkage arm 64 which is mounted at its opposite end as by the U-clamp 66 to the transmission selector rod 16. In such a mounting the movement of the levers 40 and 64 is directly parallel to the other; whereas in the previously described mounting arrangement the movement of the lever 55 carried by the rod 16 is generally parallel to the portion 52 of the T-shaped lever 40.

In the modification illustrated in FIGURE 8 the lever 55 which is connected to the transmission selector rod 16 is operatively connected to the portion 52 of the T-shaped lever 40 by means of a flexible cable 90 as an alternative to the linkage rod 54 (as shown in FIGURE 5). One end of the cable 90 is secured to the T-shaped lever 40 and the other end of the cable is pivotally mounted by the housing 92 to the free end of the lever 55. Spring means (not shown) may be provided within the housing 92 to maintain the cable 90 taut no matter what position the lever 55 may assume in response to either the rod 16 or the solenoid 26. Suitable guide means such as the sheave, or sheaves, 94 may be placed about the cable to properly align it at all times with respect to the members connected thereby.

Figure 2:
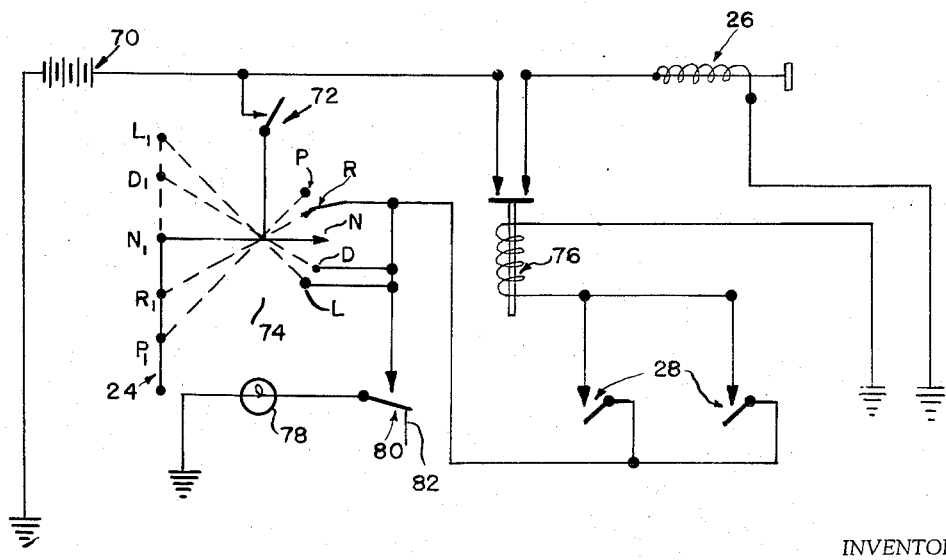
FIGURE 2 is an electrical circuit diagram of the safety device of FIGURE 1.

The particular electrical circuit for energizing the solenoid 26 upon the opening of either of the vehicle front doors 30 is shown in FIGURE 2 wherein there is shown an engine-ignition circuit comprising the usual motor vehicle battery 70 and an ignition switch 72 electrically connected therewith. A 5-position multiple selector switch 74 having one circuit for each of the various transmission positions, park, reverse, neutral, drive, and low, is electrically connected to the line side of the ignition switch 72. The multiple selector switch 74 is connected to the transmission shift linkage 24 in such a manner that when the transmission selector rod 16 is moved to select any of the available transmission positions, the corresponding individual circuit of multiple switch 74 will be closed. In the preferred embodiment of this invention, each of the circuits for the operative transmission positions, reverse, drive or low, is electrically connected with the door-operated switches 28 of the motor vehicle and the ignition switch 72. The door switches 28 are open when the vehicle door 30 is closed and are adapted to close when the vehicle door is open. The door switches 28 are each connected to a relay switch 76 which is normally open and is itself connected to the solenoid 26, the ignition switch 72 and battery 70. When the engine of the vehicle is not running, the ignition switch 72, the door switches 28, and relay switch 76 are all open and, therefore, no current may flow from the battery 70 to the solenoid 26. When the ignition switch is closed and the vehicle engine is running, the operator may select any of the transmission positions through manipulation of the transmission selector rod 16; whereupon, the transmission shift linkage 24 operates the multiple selector switch 74 to close one of the individual circuits therein, corresponding to the selected transmission position, thus completing the circuit from the battery through the ignition switch and through one of the individual circuits of the multiple selector switch 74 to the door switches 28. Should either one of the vehicle doors be open when the ignition switch 72 and any one of the individual circuits of multiple selector switch 74 be closed, the switch 28 cooperating with the open vehicle door 30 will close, thus completing the circuit from the battery 70 to the relay 76, which will then close to complete the circuit to the solenoid 26 to energize the solenoid; whereupon, the transmission shift linkage 24 will be moved to automatically shift the transmission into its neutral position. As the transmission is shifted to its neutral position, the transmission selector rod 16 is caused to move thereby through the linkage 24, moving the multiple selector switch 74 to its neutral position. As the switch corresponding to neutral in the multiple selector switch 74 is not electrically connected in the circuit, there will be no current flow from the battery to the solenoid 26 and, therefore, when the transmission is in neutral and the engine running, solenoid 26 is deenergized and the plunger 38 is restored to its position away from the pivoted lever 40 by means of the coil spring 44, as described above. When the transmission is in its neutral position, there is no current flowing to the relay switch 76 and, therefore, that switch resumes its open position as soon as the transmission is placed in its neutral position and, subsequently, as soon as the open vehicle door 30 is closed, its cooperating door-operated switch 28 resumes its open position. It should be apparent that when the ignition switch 72 is closed and any of the individual circuits corresponding to an operative transmission position, drive, low, or reverse, is closed, an opening of the vehicle door 30 will automatically close its cooperating switch 28 and through the relay switch 76 cause the solenoid 26 to be energized to automatically shift the transmission into its neutral position through the above-described linkage. Thus, an effective safety device has been provided wherein it is impossible for either the operator or the passenger to open a vehicle door and leave the vehicle transmission in an operative position. A visual indicator comprising a lamp bulb 78 mounted on the dashboard 62 of the vehicle may be connected in parallel with the multiple selector switch 74 and the door switches 28. An indicator switch 80 is interposed between the lamp 78 and the individual circuits, reverse, drive and low of the multiple switch 74. In the embodiment shown in FIGURE 2 the indicator switch 80 is operatively connected to the vehicle's accelerator linkage 82 in such a manner that when the accelerator is depressed, the switch is opened and when the accelerator is not depressed or is in an engine idling position, the switch 80 is closed to complete the circuit from the multiple selector switch 74 to the lamp 78. Therefore, when the ignition switch 72 is closed and the transmission is in any of its operative positions, reverse, drive or low, and the vehicle engine is idling so that the indicator switch 80 is closed, the circuit from the battery 70 to the lamp 78 is completed and it is lighted to indicate to the operator that the vehicle's engine is running and the transmission is in an operative position. Upon the opening of either of the vehicle doors 30 the solenoid 26 is energized, as previously described, and when the transmission is moved to its neutral position the circuit is broken from the battery 70 to the lamp 78 and the lamp is therefore automatically extinguished when the transmisison is shifted into its neutral position. By incorporating the additional visual indicator into the solenoid energizing circuit, the operator is first visually informed that the vehicle's engine is running and the transmission is in an operative position and may readily move the transmission to an inoperative position to avoid the hazard of leaving an unattended vehicle with its engine running and its transmission in an operative position. If for any reason the operator does not himself place the transmission in its neutral position and opens the door 30, then the solenoid 26 is automatically energized to do it for him.

As an alternative to the accelerator-operated switch 80, a governor switch 84 may be employed (FIGURE 7). In such an arrangement the governor switch 84 is connected to the vehicle speedometer cable 86 in such a way that when the forward motion of the vehicle falls below a predetermined value, such as approximately five miles an hour, the governor switch 84 will be closed to complete the circuit from the lamp 78 to the battery 70 if the transmission is in any of its operative positions. Should the vehicle exceed the predetermined speed, the governor switch 84 will be opened, thereby breaking the circuit and extinguishing the lamp 78.

It will thus be seen that there has been provided by this invention a device in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative and not in a limiting sense.

I claim:

1. In a motor vehicle having a door, an automatic transmission, an accelerator, a transmission selector member mounted for movement selectively into different positions, at least a plurality of said positions each corresponding to an operative position of the transmission and at least one of said positions corresponding to a neutral position of the transmission, and an engine-ignition circuit including a battery and an ignition switch; a safety device comprising: a multiple selector switch electrically connected to the ignition switch, said selector switch being operated by movement of the transmission selector member, said selector switch having a plurality of circuits, one of said circuits for each of the operative positions of the selector member; a door-operated switch electrically connected in series with each of said plurality of circuits of said selector switch, said door switch being normally open when said door is closed; a relay in series with said door switch and energized upon closing of said door switch when one of said circuits is closed, said relay including a normally open switch; a solenoid; said relay switch when closed energizing said solenoid; and shifting linkage means operatively connected to and movable by said selector member, said shifting linkage means being connected to said selector switch and being positioned adjacent said solenoid whereby the plunger of said solenoid engages the shifting linkage means when said solenoid is energized to move said shifting linkage means to a position whereby the selector member is moved from any of its operative positions to its neutral position.

2. The device as defined in claim 1 further comprising: an indicator switch electrically connected to said one switch; an indicator connected to said indicator switch; said indicator switch being operated by the accelerator; and said indicator switch being closed when said accelerator is in its idle position to actuate said indicator when said one switch and said ignition switch are closed.

3. The device as defined in claim 1 wherein the motor vehicle further includes a speedmeter and a speedometer cable; an indicator switch connected to said one switch and an indicator connected to said indicator switch; said indicator switch being operated by said speedometer cable wherein said indicator switch is closed when the speed motor vehicle as measured by the speedometer and the speedometer cable falls below a predetermined limit.

4. In a motor vehicle having a door, an automatic transmission and a transmission selector member mounted for selective movement into different positions, at least a plurality of said positions each being an operative position and at least one of said positions being a neutral position, and an engine ignition circuit including a battery and an ignition switch; a safety device comprising: a solenoid mounted upon a bracket adjacent the selector member, said solenoid being electrically connected to the engine ignition circuit; a door operated switch electrically controlling said solenoid; a plunger secured to one end of the armature of said solenoid and having a bumper plate with an operating face extending transverse to the axis of the plunger; a lever pivotally mounted on said bracket on an axis transverse of the longitudinal axis of said plunger, said lever having an operating face opposing the face of said bumper plate and being spaced from said bumper plate when said solenoid is de-energized and engageable by said bumper plate when said solenoid is energized, said pivotal axis of said lever being intermediate the ends of its operating face and said lever having a plurality of positions for its operating face which are at an angle to the operating face of said bumper plate and which correspond to operative positions of the selector member and one position for its operating face parallel to the operating face of said bumper plate and which corresponds to neutral position of the selector member; a second lever secured to the transmission selector member; means connecting said second layer to said first lever whereby movement of said first lever is transmitted to said second lever and vice versa, said first lever being moved by engagement of said bumper plate when said solenoid is energized and said first lever is in one of said operative positions.

5. The safety device defined in claim 4 in which said plunger is spring-biased away from said first lever when said solenoid is de-energized.

6. The safety device defined in claim 4 further comprising means to limit the movement of said plunger towards said first lever when said solenoid is energized.

7. The safety device defined in claim 4 wherein said means connecting said second lever to said first lever is a flexible cable.

8. The safety device defined in claim 4 wherein said means connecting said second lever to said first lever is a rigid push-pull rod.

References Cited in the file of this patent

UNITED STATES PATENTS

| | | |
|---|---|---|
| 2,182,426 | Courcier | Dec. 5, 1939 |
| 2,276,019 | Ching | Mar. 10, 1942 |
| 2,740,947 | Davies | Apr. 3, 1956 |
| 2,882,986 | Cash | Apr. 21, 1959 |
| 2,942,680 | Miller et al. | June 28, 1960 |